Feb. 26, 1963 P. E. KERN 3,078,573
DISK TYPE CUTTER
Filed March 12, 1962
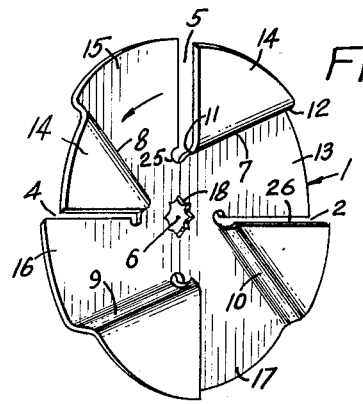
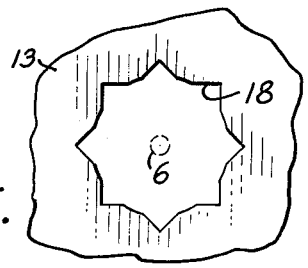
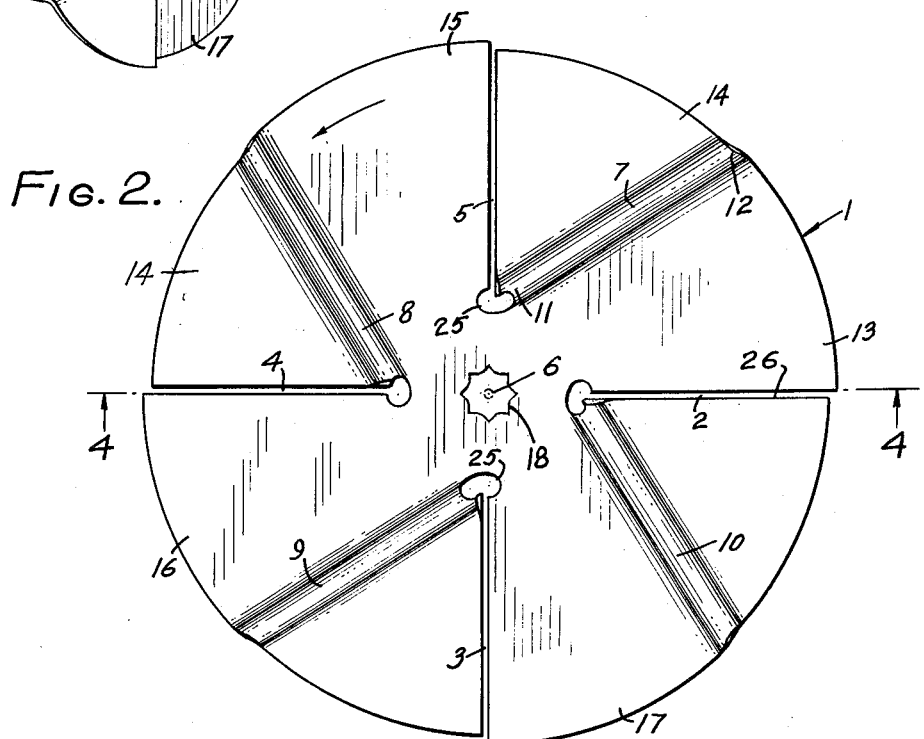
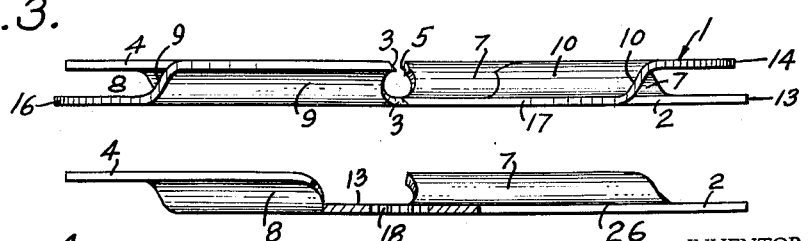
INVENTOR,
PAUL ERVIN KERN;
BY
ATTORNEY

United States Patent Office 3,078,573
Patented Feb. 26, 1963

3,078,573
DISK TYPE CUTTER
Paul Ervin Kern, 1518 W. Ash St., Fullerton, Calif.
Filed Mar. 12, 1962, Ser. No. 178,993
3 Claims. (Cl. 30—347)

The present invention relates to improvements in a disk type cutter and trimmer for lawns, hedges, and vines.

The average cutter disk generally employed in lawn edgers usually provides a series a blades arranged around the peripheral edge of the disk with the blades all lying in the plane of the disk. As a rule, such a construction does not edge a lawn in a satisfactory manner. The blade may strike the edge of the sidewalk with resulting damage either to the sidewalk or to the blades and in any event, the blades are dulled. Furthermore, a disk of the type mentioned does not operate satisfactorily for the trimming of hedges or vines.

My invention has for an object the provision of a disk type cutter so constructed as to cut vines, hedges, and to edge a lawn without damage to either the cutting edges of the disk cutter or to a sidewalk, and which will maintain its cutting edge.

A further object is the provision of a disk type cutter and edger so constructed and arranged as to trim a hedge or vine without the hedge or vine becoming entangled with the disk. As an example, in the cutting of vines such as ivy, the disk during rotation advances upon certain of the vines to move the same away from the cutting edge of the disk while cutting or severing other portions of the vine with the result that the vines do not become entangled with the disk and cutting operation may proceed rapidly with the vines cut evenly to give the best appearance therefor. This is particularly true for hedges, usually formed from box wood, as the side walls may be cut in such a manner as to have an even, flat, side and top walls.

Another object is to provide a disk type cutter for lawns, hedges and the like which is so constructed that if the disk during rotation strikes an obstruction, the disk is moved away from the obstruction so that no damage to the cutting edge of the disk will occur.

Other objects and advantages of my invention will be apparent from the description which follows, which objects include simplicity of construction, ease of fabrication, inexpensiveness in cost of manufacture, and general superiority over cutting disks now known to the inventor.

In the drawing:

FIGURE 1 is a perspective view showing one side of the disk type cutter of my invention;

FIGURE 2 is a plan view of the disk type cutter on an enlarged scale;

FIGURE 3 is an edge view of the disk type cutter shown in FIGURE 2;

FIGURE 4 is a sectional view on the line 4—4 of FIGURE 2; and,

FIGURE 5 is an enlarged detail of the center hole construction for the disk type cutter.

Referring now to the drawing, the disk type cutter for lawns, hedges, and vines, is designated as an entirety by the numeral 1, and provides a disk formed of any suitable material such as steel, provided with at least four slots 2, 3, 4, and 5 which extend from the peripheral edge of the disk inwardly for a given distance. These slots are in 90° relationship and are radial with respect to the disk axis 6. This construction provides what may be termed four equal area sectors interposed between adjacent slots, as, for instance, the sector between slots 2 and 3 and a further sector between slots 3 and 4, etc. Each sector is provided with identical offset walls, as shown at 7, 8, 9, and 10. Each offset wall terminates at the inner end of a slot and extends to the peripheral edge of the disk, as shown for the wall 7 at 11 and 12. The offset wall in each case is not radial but lies on what may be termed a chord line of the disk, thus each sector has one wing or blade lying in one plane 13 and a second wing or blade 14 lying in a different plane the two wings 13 and 14 being parallel and separated by the offset wall 7. The slope of each offset wall, see FIGURE 3, is at a 60° angle to plane of the wing 14, although this angle is arbitrary and other angles may be used. All of the offset walls 7, 8, 9, and 10, lie at a 60° angle to the edge of the wings 14 adjacent the slots 2 to 5 inclusive. It is to be observed with relation to the offset walls, that offset walls 7 and 10 are in right angular relationship and that offset wall 7 is in right angular relationship to wall 8 which, in turn, is in right angular relationship to wall 9. The walls 8 and 10 are in parallel relationship as are the walls 7 and 9. Thus, if the walls were elongated so as to intersect, the different offset walls would be in 90° relationship. FIGURES 1 and 2 show that the wings at 13, 15, 16 and 17 of the four sectors all lie in the same plane and are centrally joined together. This portion of the disk includes the center bore 18 provided with angular keyways to receive a splined shaft. Other constructions could be resorted to for keying the disk to a shaft for rotation. As shown in FIGURES 3 and 4, the edge of each sector adjacent a slot such as 2 is beveled to provide a cutting edge. I have found it expedient to bore the disk transversely at four points, as shown for one of said points at 25 where an edge of a slot and one end of the offset wall 7 intersect.

The operation, uses and advantages of my invention are as follows.

I assume that the disk type cutter of my invention is mounted on a shaft connected with a lawn edger or a hand operated portable electric drill, or similar device. Either side of the disk may be utilized and the disk is adapted to rotate counterclockwise or in the direction of the arrows shown on one of the segments of FIGURES 1 and 2. The slope of each offset wall 7 to 10 inclusive is such as to move the disk during a cutting operation away from an obstruction to the end that the disk is not damaged. This is true particularly in the cutting of hedges and vines as the cutting edge will cut the hedge and the vine and push other portions which are not to be cut away from the cutting edge of the disk. Thus, in FIGURE 2, the leading cutting edge 26 for wing 14 advances to cut grass or other material and the same is true for all other wings of each sector. Thus, the advancing cutting edge of wing 14 severs the grass or other material while the offset wall 7 for said sector will engage the material which is not to be cut and move it to one side. If the disk is in the act of trimming or edging a lawn, the offset wall portions will constantly strike the edge of the walk and assure that the cutting edges do not strike the walk. All obstructions such as a stone or the like, would contact the offset walls and by moving the disk to one side damage to the disk is avoided.

I have found that a high grade steel such as 1020 steel is satisfactory for the disk material. Disks of the type of the present invention can be of any diameter, but usually the average disk for use on a lawn edger and trimmer is of eight inch diameter. The spacing between the wings of each sector may vary, although I have found a spacing of .436 inch to be satisfactory. Nevertheless, I do not wish to be restricted to such a spacing, although the spacing should be sufficient to avoid sector wing interference during a cutting or trimming operation.

I claim:

1. A cutter for an edging and trimming tool, including: a disk having four separate sectors with each sector provided with two wings, one wing of each sector lying in the same plane and the second wing of each sector lying in one plane but spaced from the plane of the first wings and the two wings of each sector being in parallel relationship, the two wings of each sector being interconnected by an offset chordal wall.

2. The device as set forth in claim 1, the angle of each offset chordal wall joining the two wings of a sector, being substantially at a 60° angle to the plane of one of the wings.

3. A cutter for an edging and trimming tool, including: a disk provided with radial slots extending from the peripheral edge of the disk inwardly and spaced from the center of the disk, said slots being arranged in 90° relationship and the disk between adjacent slots defining sectors each including two wings in offset parallel relationship, the two wings of each sector being interconnected by an offset chordal wall.

References Cited in the file of this patent
UNITED STATES PATENTS

| | | |
|---|---|---|
| 1,954,579 | Smith | Apr. 10, 1934 |
| 2,312,569 | Maga | Mar. 2, 1943 |
| 2,799,985 | Rosenberg | July 23, 1957 |
| 2,859,581 | Kroll et al. | Nov. 11, 1958 |
| 2,908,128 | Mauro | Oct. 13, 1959 |
| 2,917,826 | Pohr | Dec. 22, 1959 |